United States Patent
Karabinis

Patent Number: 6,081,709
Date of Patent: Jun. 27, 2000

[54] MOBILE SATELLITE RADIOTELEPHONE SYSTEMS AND METHODS INCLUDING MOBILE RADIOTELEPHONE BANDWIDTH CONVERSION

[75] Inventor: Peter D. Karabinis, Cary, N.C.

[73] Assignee: Ericsson, Inc., Research Triangle Park, N.C.

[21] Appl. No.: 08/920,492

[22] Filed: Aug. 29, 1997

[51] Int. Cl.[7] .................................................. H04Q 7/20
[52] U.S. Cl. .......................................... 455/427; 455/12.1
[58] Field of Search .................................. 455/427, 121, 455/13.1, 13.2

[56] References Cited

U.S. PATENT DOCUMENTS

| | | | |
|---|---|---|---|
| 4,752,925 | 6/1988 | Thompson et al. | 370/307 |
| 5,539,703 | 7/1996 | Dent | 370/29 |
| 5,633,891 | 5/1997 | Rebec et al. | 455/12.1 |
| 5,640,386 | 6/1997 | Wiedeman, II | 455/12.1 |
| 5,758,261 | 5/1998 | Wiedeman, I | 455/427 |
| 5,943,324 | 8/1999 | Ramesh et al. | 455/12.1 |

FOREIGN PATENT DOCUMENTS

| | | |
|---|---|---|
| 0 748 063 A2 | 12/1996 | European Pat. Off. . |
| WO 92/21195 | 11/1992 | WIPO . |
| WO 96/28900 | 9/1996 | WIPO . |
| WO 97/24884 | 7/1997 | WIPO . |
| WO 98/36510 | 8/1998 | WIPO . |

OTHER PUBLICATIONS

First Written Opinion, PCT/US98/17904, Jun. 10, 1999.

International Search Report, PCT/US98/17904, Jan. 27, 1999.

*Primary Examiner*—Dwayne D. Bost
*Assistant Examiner*—Myron K. Wyche
*Attorney, Agent, or Firm*—Myers Bigel Sibley & Sajovec

[57] ABSTRACT

Direct, single hop narrow band TDMA radiotelephone communications among mobile satellite radiotelephones is provided via a satellite, while also providing reception of wide band TDMA radiotelephone communications from other telephone systems and/or among the satellite radiotelephones via a gateway and satellite, by providing TDMA bandwidth conversion in the mobile radiotelephones themselves. By relieving the satellite of the need to perform TDMA bandwidth conversion, the size, weight and/or power consumption of the satellite may be reduced.

26 Claims, 3 Drawing Sheets

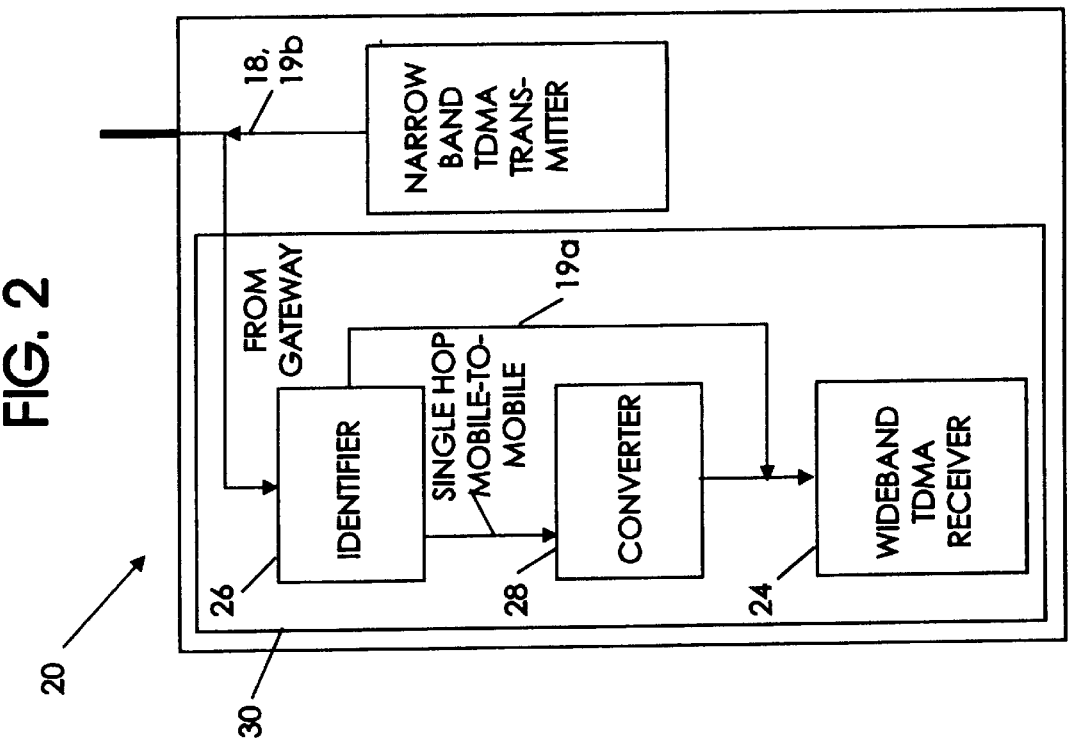
FIG. 2
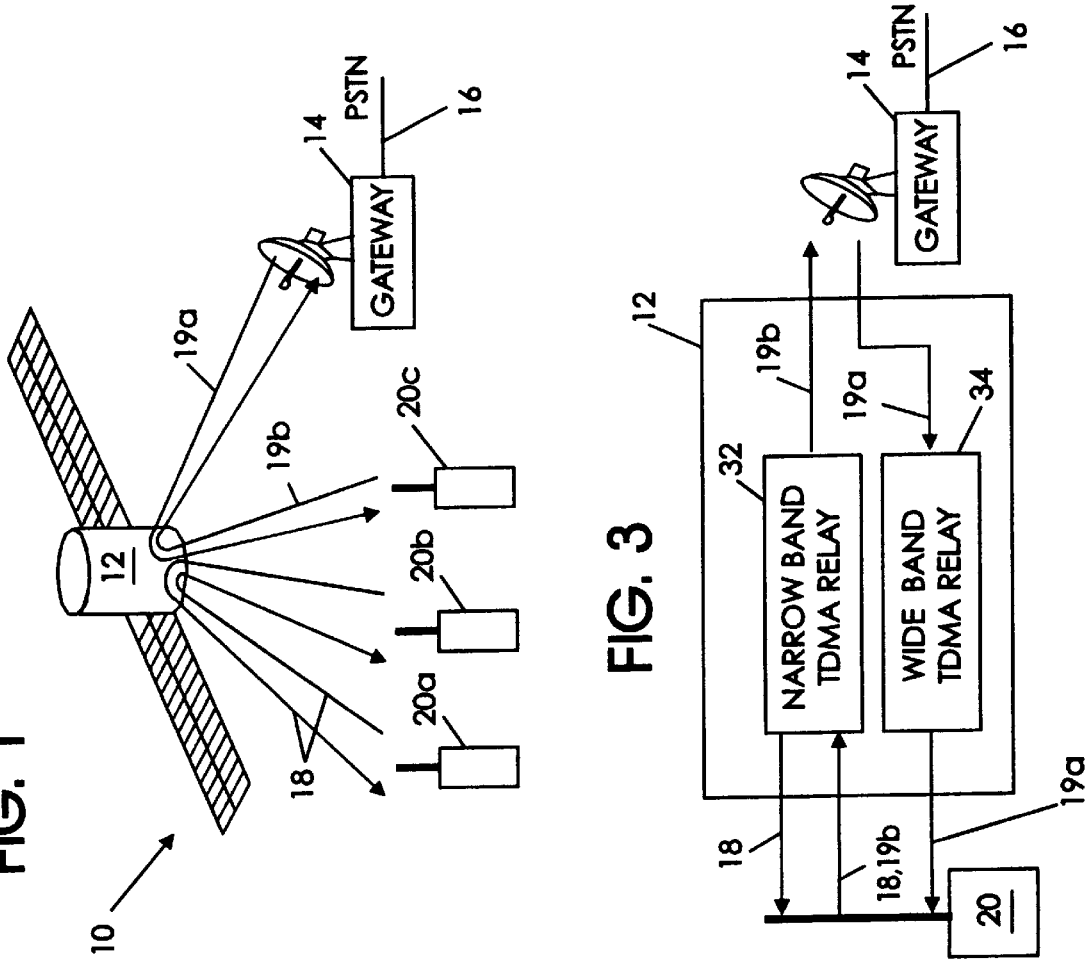
FIG. 1
FIG. 3

MOBILE SATELLITE RADIOTELEPHONE SYSTEMS AND METHODS INCLUDING MOBILE RADIOTELEPHONE BANDWIDTH CONVERSION

FIELD OF THE INVENTION

This invention relates to radiotelephone systems and methods, and more particularly to mobile satellite radiotelephone systems and methods.

BACKGROUND OF THE INVENTION

Mobile satellite radiotelephone systems are being developed and deployed at many locations around the world. As is known to those having skill in the art, a mobile satellite radiotelephone system includes at least one satellite and at least one gateway that interfaces the mobile satellite radiotelephone system to other telephone systems such as wire telephone systems or mobile cellular radiotelephone systems. A plurality of satellite radiotelephones communicate with the satellite to provide mobile satellite radiotelephone communications. It will be understood that radiotelephone systems and other telephone systems can be used for voice and data communications, so that radiotelephones and other telephones can include terminals such as PCS terminals.

A major concern in mobile satellite radiotelephone systems is the reduction in the peak power consumption in the mobile satellite radiotelephones. In order to reduce the peak power required by the radiotelephone during transmissions to the satellite, it is known to use a narrow band Time Division Multiple Access (TDMA) waveform.

Many mobile satellite radiotelephone systems currently being planned or used, employ TDMA communications. In TDMA systems, multiple communications may operate on a single communications carrier by assigning non-overlapping time slots to each communication. In order to reduce the peak power requirements on the mobile satellite radiotelephones, it is known to use narrow band TDMA communications having frames with relatively few time slots. By providing relatively few slots for a given frame duration, each slot can be longer so that less peak power may be required for the communications. Battery peak power can thereby be reduced for the mobile satellite radiotelephones.

In contrast, in transmissions from the satellite to the mobile satellite radiotelephones, where the peak power issue is not as great a concern, wide band TDMA communications involving frames with more slots may be used. Wide band TDMA can increase the number of radiotelephones with which the satellite can communicate on a single carrier.

Accordingly, mobile satellite radiotelephone communications systems may use a non-symmetrical air interface, with narrow band TDMA used for mobile to satellite communications and wide band TDMA employed from satellite to mobile communications. A non-symmetrical air interface for mobile satellite radiotelephone systems is described in U.S. Pat. No. 5,539,730, Jul. 23, 1996 entitled TDMA/FDMA/CDMA Hybrid Radio Access Methods to Paul W. Dent and assigned to the assignee of the present invention, the disclosure of which is hereby incorporated herein by reference.

In geostationary mobile satellite radiotelephone systems it is also generally desirable to allow direct communications among the mobile satellite radiotelephones via the satellite without requiring the communications to pass through the gateway. These "single hop" communications can reduce delays which might otherwise be present if communications are relayed from one mobile satellite radiotelephone to another mobile satellite radiotelephone via the gateway. In order to effect single hop communications, the satellite generally includes rate conversion systems which convert received narrow band TDMA signals into wide band TDMA signals for transmission to the mobile satellite radiotelephones. Rate conversion in a satellite is described in application Ser. No. 08/581,110, filed Dec. 29, 1995, entitled "Time Compressing Transponder" to Paul W. Dent, and assigned to the assignee of the present invention, the disclosure of which is hereby incorporated herein by reference. Accordingly, the mobile satellite radiotelephones can transmit using narrow band TDMA and receive using wide band TDMA regardless of whether radiotelephone communications are being carried on with the gateway or among the mobile satellite radiotelephones themselves.

SUMMARY OF THE INVENTION

The present invention provides direct, single hop, narrow band TDMA radiotelephone communications among a plurality of mobile satellite radiotelephones, while also providing reception of wide band TDMA radiotelephone communications via a gateway and satellite, by providing TDMA bandwidth conversion in the mobile satellite radiotelephones themselves. By relieving the satellite of the need to perform TDMA bandwidth conversion, the size, weight and/or power consumption of the satellite may be reduced.

In particular, according to the present invention, a mobile satellite radiotelephone system includes a satellite, a gateway that interfaces the mobile satellite radiotelephone system to other telephone systems such as wire telephone systems and/or cellular telephone systems, and a plurality of mobile satellite radiotelephones. Each mobile satellite radiotelephone includes means for transmitting radiotelephone communications to the satellite at a first signal bandwidth. Each mobile satellite radiotelephone also includes means for receiving radiotelephone communications from the gateway via the satellite at a second signal bandwidth and for receiving radiotelephone communications from the mobile satellite radiotelephones via the satellite at the first signal bandwidth.

In preferred embodiments of the present invention, the receiving means includes means for identifying whether received radiotelephone communications originate from the gateway or from the mobile satellite radiotelephones themselves. Converting means is responsive to the identifying means for converting radiotelephone communications received from the mobile satellite radiotelephones from the first signal bandwidth to the second signal bandwidth. In general, the first signal bandwidth is narrow band TDMA and the second signal bandwidth is wide band TDMA. The converting means may be reclocking means, resampling means, other rate converting means or other bandwidth converting means known to those having skill in the art.

Satellites for mobile satellite radiotelephone communications according to the present invention include first means for relaying radiotelephone communications between the mobile satellite radiotelephones and among the mobile satellite radiotelephones to the gateway at the first signal bandwidth. Means are also included for relaying radiotelephone communications from the gateway to the mobile satellite radiotelephones at a second signal bandwidth. The satellite itself can therefore be made free of bandwidth converting means, because bandwidth conversion may take place in the mobile satellite radiotelephones. By relieving the satellite of bandwidth conversion burdens, size, weight, cost and/or power consumption in the satellite may be reduced. Related methods of operating satellites and mobile satellite radiotelephones are also provided.

BRIEF DESCRIPTION OF THE DRAWINGS

FIG. 1 illustrates mobile satellite radiotelephone systems according to the present invention.

FIG. 2 is a block diagram illustrating mobile satellite radiotelephones of FIG. 1.

FIG. 3 is a block diagram illustrating satellites of FIG. 1.

DETAILED DESCRIPTION OF THE INVENTION

Figure 4:
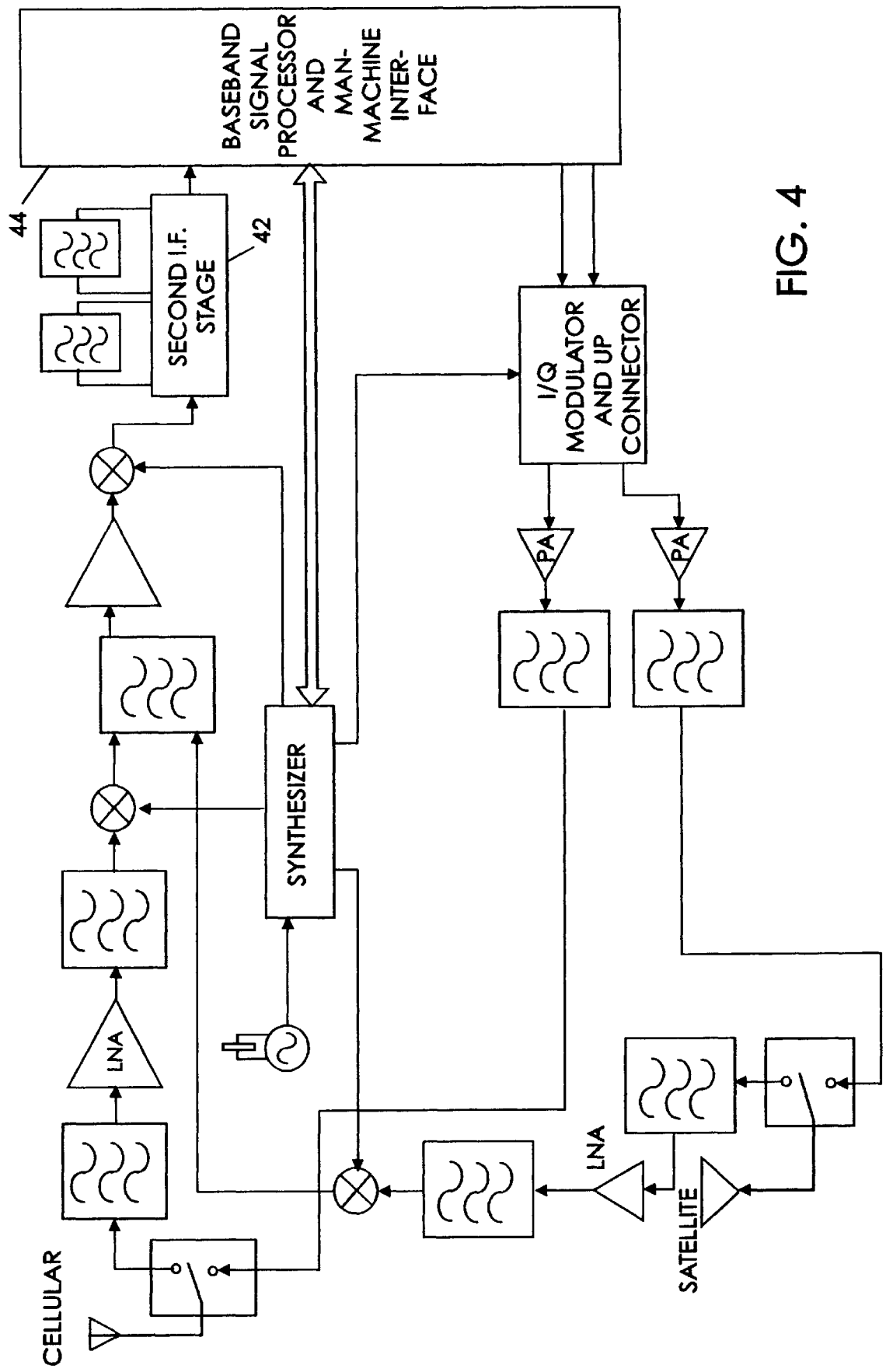
FIG. 4 is a block diagram of a conventional dual mode satellite/cellular telephone.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

As will be appreciated by one of skill in the art, the present invention may be embodied as methods or devices. The present invention may take the form of an entirely hardware embodiment or an embodiment combining software and hardware aspects.

The present invention is described herein with reference to block diagrams. It will be understood that a block, and combinations of blocks, can be implemented by computer program instructions. These program instructions may be provided to a processor to produce a machine, such that the instructions which execute on the processor create means for implementing the functions specified in the block or blocks. The computer program instructions may be executed by a processor to cause a series of operational steps to be performed by the processor to produce a computer implemented process such that the instructions which execute on the processor provide steps for implementing the functions specified in the block or blocks.

Accordingly, blocks of the drawings support combinations of means for performing the specified functions, combinations of steps for performing the specified functions and computer program instruction means for performing the specified functions. It will also be understood that each block, and combinations of blocks, can be implemented by special purpose hardware-based systems which perform the specified functions or steps, or by combinations of special purpose hardware and computer instructions.

Referring now to FIG. 1, mobile satellite radiotelephone systems according to the present invention will now be described. As shown, mobile satellite radiotelephone system 10 includes at least one satellite 12, at least one gateway 14 and a plurality of mobile satellite radiotelephones 20a–20c. As shown in FIG. 1, satellite 12 performs two functions. First, it interfaces the mobile radiotelephones 20 to other telephone systems via gateway 14. Accordingly, as shown in FIG. 1, gateway 14 is connected to the Public Switched (wire) Telephone Network (PSTN) 16 for connection to wire telephones, cellular telephones and/or other satellite systems.

Communications between mobile satellite radiotelephones and other telephone systems are illustrated by mobile satellite radiotelephone 20c. As shown, mobile satellite radiotelephone 20c transmits radiotelephone communications to gateway 14 via satellite 12 using narrow band TDMA links 19b and receives radiotelephone communications from other telephone systems via gateway 14 and satellite 12 using wide band TDMA links 19a. It will be understood that gateway 14, the PSTN 16 or other elements of the system may perform conversion between wide band and narrow band TDMA. This conversion may be performed as part of the signal regeneration/reconstruction that typically is performed at the gateway and/or the PSTN.

Mobile satellite radiotelephone system 10 operates in a second mode, for radiotelephone communications among mobile satellite radiotelephones 20 in the mobile satellite radiotelephone system 10. In particular, as shown by mobile satellite radiotelephones 20a and 20b, radiotelephone communications are transmitted and received between mobile satellite radiotelephones 20a and 20b, using narrow band TDMA. This single hop mobile-to-mobile connection via satellite 12 allows transmission among the mobile satellite radiotelephones without the need to pass through the gateway 14. Single hop radiotelephone communications among the mobile satellite radiotelephones is thereby provided, with a consequent decrease in delay times.

It will also be understood that, although not shown in FIG. 1, radiotelephone communications among the mobile satellite radiotelephones 20 in the mobile satellite radiotelephone system 10 may also be provided by a double-hop arrangement using the gateway 14. This is generally not a preferred mobile-to-mobile communications mode because of the additional signal delay that may be introduced. Preferably, mobile-to-mobile communications take place in a single-hop (direct) mode using satellite 12, without using gateway 14. Nonetheless, if double hop communications are used, the mobile radiotelephones 20 receive radiotelephone communications from other mobile radiotelephones 20 via the satellite 12 and gateway 14 using wide bandwidth links.

Referring now to FIG. 2, a mobile satellite radiotelephone 20 of FIG. 1 will now be described. As shown, satellite radiotelephone 20 includes a narrow band TDMA transmitter 22 which transmits radiotelephone communications from the mobile satellite radiotelephone to another mobile satellite radiotelephone via satellite 12, or to other telephone systems or other mobile satellite radiotelephones via satellite 12 and gateway 14. Mobile satellite radiotelephone 20 also includes a TDMA receiver 30 which receives telephone communications from the other telephone systems or other mobile satellite radiotelephones via the satellite 12 and gateway 14 at a wide bandwidth and which receives single hop (direct) radiotelephone communications from the mobile satellite radiotelephones 20 via the satellite 12 at a narrow bandwidth, without passing through gateway 14.

It will be understood that two separate TDMA receivers may be provided in the cellular mobile radiotelephones 20. However, preferably a single receiver 30 is provided along with bandwidth conversion. In particular, as shown in FIG. 2, an identifier 26 identifies whether the received radiotelephone communications originate from the gateway or from the mobile satellite radiotelephones themselves. If the received radiotelephone communications originate from the gateway, then bandwidth conversion is not necessary and the received radiotelephone communications are provided directly to wide band TDMA receiver 24.

On the other hand, if the received radiotelephone communications are identified as being from another mobile satellite radiotelephone 20, the received communications are provided to converter 28 to convert the received radiotelephone communications from narrow band TDMA to wide band TDMA. The converted radiotelephone communications are then provided to wide band TDMA receiver 24. Alternatively, the mobile satellite radiotelephone 20 can include a narrow band TDMA receiver so that the converter provides wide band to narrow band conversion when the received radiotelephone communications are identified as being received from the gateway.

FIG. 3 is a block diagram of a satellite 12 of FIG. 1. As shown in FIG. 3, the satellite includes a narrow band TDMA relay 32 that relays radiotelephone communications 18 between the mobile satellite radiotelephones 20 and also relays radiotelephone communications 19b from the mobile satellite radiotelephones to the gateway 14. The satellite also includes a wide band TDMA relay 34 that relays radiotelephone communications 19a from the gateway 14 to the mobile satellite radiotelephones 20. As also shown in FIG. 3, the satellite 12 is free of bandwidth conversion. Rather, the satellite operates as a narrow band and wide band TDMA relay. The cost, size, weight and power dissipation associated with TDMA bandwidth conversion need not be provided in satellite 12 according to the present invention.

FIG. 4 is a block diagram of a conventional dual mode satellite/cellular radiotelephone. As shown in FIG. 4, the radiotelephone includes a common baseband signal processor and man-machine interface 44. A synthesizer, I/Q modulator and up-converter and second IF stage 42 is also provided. The cellular transceiver includes filters, low-noise amplifiers (LNA) and modulators. Similarly, the cellular transmitter includes a power amplifier (PA) and a filter. The satellite transceiver includes similar filters, low-noise amplifiers and power amplifiers. The design of a dual mode satellite/cellular radiotelephone is well known to those having skill in the art, and need not be described further herein.

In a conventional dual mode satellite/cellular radiotelephone, the received signal, whether in satellite or cellular mode, is assumed to comprise carriers of similar bandwidth spaced apart by the same amount, such as 200 KHz. When one radiotelephone is communicating with another radiotelephone directly via the satellite using a narrow band waveform, payload rate conversion in the satellite can ensure that the received carrier still occupies a bandwidth which is similar to that of communications between the radiotelephone and the gateway. If payload rate conversion was not provided in the satellite, the received carrier bandwidth in single hop communications would be 1/N that of satellite radiotelephone to gateway communications, with N being 2, 4 or even 8 depending on the level of nonsymmetry used for the forward and return links.

According to the invention, a satellite radiotelephone or a dual mode satellite/cellular radiotelephone includes bandwidth converting circuitry such as rate converting circuitry. First and second embodiments of rate conversion will be described in FIGS. 5 and 6. In both embodiments, converting circuitry is inserted between the second IF stage 42 and the baseband signal processor 44 of FIG. 4. However, other embodiments of satellite radiotelephones or dual mode satellite/cellular radiotelephones may use different configurations of bandwidth converting circuitry.

Accordingly, the satellite 12 relays signals from the gateway 14 to the satellite radiotelephones 20 using wide band TDMA signals having a bandwidth B and a frame slot duration T. During single hop communications in which the satellite 12 relays signals from one satellite radiotelephone 20 to another, a narrow band TDMA format having a smaller bandwidth B/M and a longer frame slot duration MT is used, where M is an integer such as 2, 4 or 8.

Figure 5:
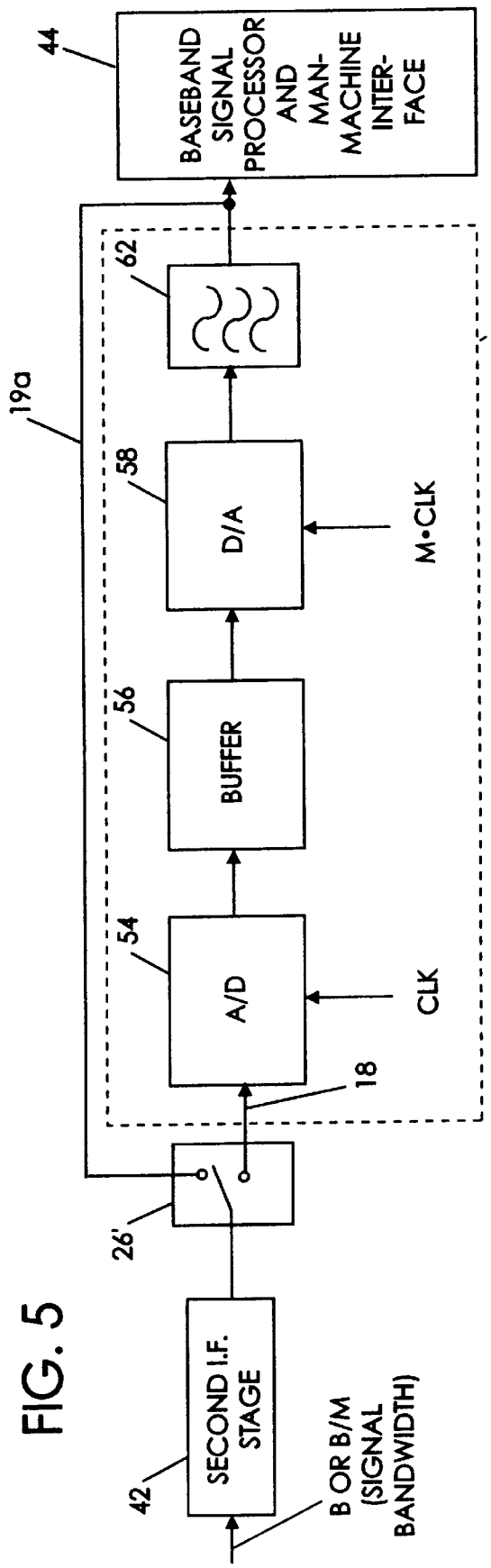
FIG. 5 is a block diagram of a first embodiment of bandwidth conversion according to the present invention.

Referring now to FIG. 5, an identifier 26' in the form of a switch is responsive to coded satellite radiotelephone transmissions which indicate whether transmissions originated from another satellite radiotelephone 20 or from the gateway 14. When the transmissions originated from the gateway 14, the switch 26' is placed in the upper position of FIG. 5 and the converter 28' is bypassed. On the other hand, when the transmission signalling indicates that it is being received from another satellite radiotelephone, the switch 26' is placed in the down position, to thereby activate converter 28'.

As shown in FIG. 5, the converter includes an analog-to-digital (A/D) converter 54 which is activated by a clock CLK. Clock CLK preferably samples the received signal fast enough to avoid aliasing. The digital samples are placed in a buffer 56 and are then digital-to-analog converted at a clock rate of M-CLK by digital-to-analog (D/A) converter 58. A low pass filter 62 is then applied to the analog signal, which is then provided to the baseband signal processor and man-machine interface 44.

Figure 6:
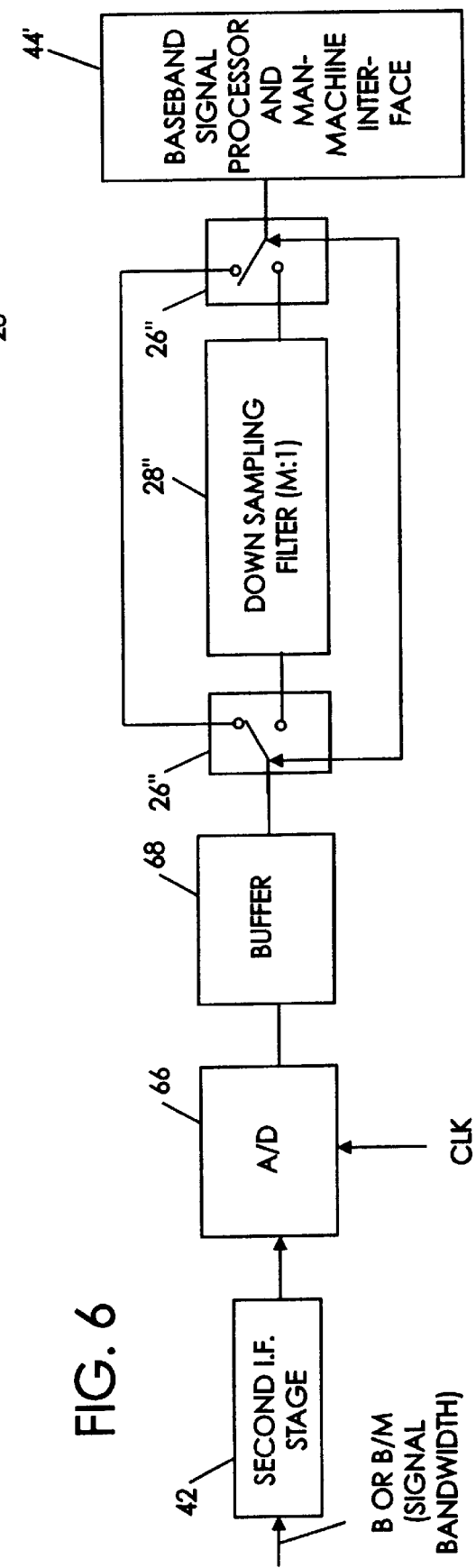
FIG. 6 is a block diagram of a second embodiment of bandwidth conversion according to the present invention.

FIG. 6 illustrates another embodiment of rate conversion according to the present invention. As shown in FIG. 6, a signal of either bandwidth B or B/M passes through the second IF stage 42 that is designed for the bandwidth—B signal, and is sampled by an analog-to-digital converter 66. Analog to digital converter 66 may operate at a clock rate CLK, for example 1.35B. After sampling, a buffer memory 68 capable of storing at least MN samples obtains either N samples for the bandwidth B case or MN samples for the bandwidth B/M case. In the bandwidth B/M case, the resulting MN samples are downsampled by M:1 in downsampling filter 28" to be consistent with the rest of the band B receiver.

It will be understood that the Baseband Signal Processor and Man-Machine interface 44 of FIG. 5 is generally not identical to that of FIG. 6 (44'). Specifically, Block 44 receives an analog signal whereas for Block 44', the input is a discrete time (digital) equivalent. As such, Block 44 of FIG. 5 may contain means for digitizing its analog input signal, whereas for Block 44' of FIG. 6, such means are generally not needed since the input is already in digital form.

Accordingly, the switches 26" of FIG. 6 are both set to the down position to enable an M:1 rate (bandwidth) conversion. In the bandwidth B case, the N samples stored in the buffer are already at the correct sample rate. Therefore, switches 26" are set to the up position, bypassing the rate conversion filter. The rate conversion filter is also thus bypassed when a gateway to satellite radiotelephone connection is established.

The satellite radiotelephone is preferably a dual-mode radiotelephone supporting both communications directly with a terrestrial cellular network (GSM) as well as communications via the satellite 12, gateway 14, and PSTN 16. FIG. 4 illustrates the dual-mode nature of the satellite radiotelephone. Advantageously, the waveform used (forward link) may be similar (in both bandwidth and carrier spacing) to the waveform used for terrestrial cellular network (GSM)-to-satellite radiotelephone terrestrial mode (GSM) communications. As such, the rate conversion filter 28" may also be bypassed when a terrestrial cellular-to-satellite radiotelephone cellular connection is established.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile satellite radiotelephone system comprising:
    a satellite;
    a gateway that interfaces the mobile satellite radiotelephone system to other telephone systems; and
    a plurality of mobile satellite radiotelephones, each comprising:
        means for transmitting radiotelephone communications to the satellite at a first signal bandwidth; and
        means for receiving radiotelephone communications from the gateway via the satellite at a second signal bandwidth and for receiving radiotelephone communications from the mobile satellite radiotelephones via the satellite at the first signal bandwidth, wherein the receiving means further comprises means for converting radiotelephone communications received from the mobile satellite radiotelephones from the first signal bandwidth to the second signal bandwidth.

2. A mobile satellite radiotelephone system according to claim 1 wherein the receiving means further comprises:
    means for identifying whether received radiotelephone communications originate from the gateway or from the mobile satellite radiotelephones, the converting means being responsive to the identifying means.

3. A mobile satellite radiotelephone system according to claim 1 wherein the first signal bandwidth is narrower than the second signal bandwidth.

4. A mobile satellite radiotelephone system according to claim 1 wherein the first signal is narrow band TDMA and the second signal is wide band TDMA.

5. A mobile satellite radiotelephone system according to claim 1 wherein the converting means comprises reclocking means.

6. A mobile satellite radiotelephone system according to claim 1 wherein the converting means comprises resampling means.

7. A satellite for a mobile satellite radiotelephone system, the satellite communicating with a gateway that interfaces the mobile satellite radiotelephone system to other telephone systems and also communicating with a plurality of mobile satellite radiotelephones, the satellite comprising:
    first means for relaying radiotelephone communications among the mobile satellite radiotelephones and from the mobile satellite radiotelephones to the gateway at a first signal bandwidth; and
    second means for relaying radiotelephone communications from the gateway to the mobile satellite radiotelephones at a second signal bandwidth, wherein the satellite is free of bandwidth converting means.

8. A satellite according to claim 7 wherein the first signal bandwidth is narrower than the second signal bandwidth.

9. A satellite according to claim 7 wherein the first signal is narrow band TDMA and the second signal is wide band TDMA.

10. A mobile satellite radiotelephone that communicates with other mobile satellite radiotelephones and other telephones via a satellite, the mobile satellite radiotelephone comprising:
    means for transmitting radiotelephone communications to the satellite at a first signal bandwidth; and
    means for receiving radiotelephone communications from the other telephones via the satellite at a second signal bandwidth and for receiving radiotelephone communications from the other mobile satellite radiotelephones via the satellite at the first signal bandwidth, wherein the receiving means further comprises means for converting radiotelephone communications received from the other mobile satellite radiotelephones from the first signal bandwidth to the second signal bandwidth.

11. A mobile satellite radiotelephone system according to claim 10 wherein the receiving means further comprises means for receiving radiotelephone communications from the other mobile satellite radiotelephone via the satellite and a gateway at the second signal bandwidth.

12. A mobile satellite radiotelephone system according to claim 10 wherein the receiving means further comprises:
    means for converting radiotelephone communications received from the other mobile satellite radiotelephones from the first signal bandwidth to the second signal bandwidth.

13. A mobile satellite radiotelephone according to claim 10 wherein the receiving means further comprises:
    means for identifying whether received radiotelephone communications originate from the other telephones or from the other mobile satellite radiotelephones, the converting means being responsive to the identifying means.

14. A mobile satellite radiotelephone according to claim 10 wherein the first signal bandwidth is narrower than the second signal bandwidth.

15. A mobile satellite radiotelephone according to claim 10 wherein the first signal is narrow band TDMA and the second signal is wide band TDMA.

16. A mobile satellite radiotelephone according to claim 10 wherein the mobile satellite radiotelephone further comprises cellular radiotelephone transceiving means, to provide a dual mode satellite/cellular radiotelephone.

17. A mobile satellite radiotelephone according to claim 10 wherein the converting means comprises reclocking means.

18. A method of operating a satellite in a mobile satellite radiotelephone system, the satellite communicating with a gateway that interfaces the mobile satellite radiotelephone system to other telephone systems and also communicating with a plurality of mobile satellite radiotelephones, the satellite operating method comprising the steps of:
    relaying radiotelephone communications among the mobile satellite radiotelephones and from the mobile satellite radiotelephones to the gateway at a first signal bandwidth; and
    relaying radiotelephone communications from the gateway to the mobile satellite radiotelephones at a second signal bandwidth, wherein the satellite operates free of bandwidth converting.

19. A method according to claim 18 wherein the first signal bandwidth is narrower than the second signal bandwidth.

20. A method according to claim 18 wherein the first signal is narrow band TDMA and the second signal is wide band TDMA.

21. A method of operating a mobile satellite radiotelephone that communicates with other mobile satellite radiotelephones and with other telephones via a satellite, the mobile satellite radiotelephone operating method comprising the steps of:

transmitting radiotelephone communications to the satellite at a first signal bandwidth;

receiving radiotelephone communications from the other telephone systems via the satellite at a second signal bandwidth;

receiving radiotelephone communications from the other mobile satellite radiotelephones via the satellite at the first signal bandwidth; and converting radiotelephone communications received from the other mobile satellite radiotelephones from the first signal bandwidth to the second signal bandwidth.

22. A method according to claim 21 wherein the mobile satellite radiotelephone also communicates with the other mobile satellite radiotelephones via the satellite and a gateway; the method further comprising the step of:

receiving radiotelephone communications from the other mobile satellite radiotelephones via the satellite and the gateway at the second signal bandwidth.

23. A method according to claim 21 wherein the converting step is preceded by the step of:

identifying whether received radiotelephone communications originate from the other telephone systems or from the other mobile satellite radiotelephones.

24. A method according to claim 21 wherein the first signal bandwidth is narrower than the second signal bandwidth.

25. A method according to claim 24 wherein the first signal is narrow band TDMA and the second signal is wide band TDMA.

26. A method according to claim 21 wherein the converting step comprises the step of reclocking the radiotelephone communications received from the other mobile satellite radiotelephones.

* * * * *

UNITED STATES PATENT AND TRADEMARK OFFICE
CERTIFICATE OF CORRECTION

PATENT NO.    :   6,081,709
DATED         :   June 27, 2000
INVENTOR(S)   :   Peter D. Karabinis It is certified that error appears in the above-identified patent and that said Letters Patent is hereby corrected as shown below:

On the cover page:
[73] Please delete "Ericsson, Inc." and substitute – Ericsson Inc. –

In the specification:
Column 10, line12, please delete "24" and substitute – 21 – therefor.

Signed and Sealed this

Seventeenth Day of April, 2001

NICHOLAS P. GODICI

Attest:

Attesting Officer

Acting Director of the United States Patent and Trademark Office